United States Patent
Bustamante et al.

[11] Patent Number: 5,810,484
[45] Date of Patent: Sep. 22, 1998

[54] BEARING FOR SLANTED SURFACES

[75] Inventors: Eleazor Felipe Bustamante, New Hamburg; Phillip G. Adams, Etobicóke; Catherine Hoskin; David Yan Leng, both of Mississauga, all of Canada

[73] Assignee: CTS Corporation, Elkhart, Ind.

[21] Appl. No.: 921,627

[22] Filed: Aug. 27, 1997

[51] Int. Cl.[6] ............................. F16C 19/10; F16C 33/46
[52] U.S. Cl. ........................ 384/609; 384/614; 384/617
[58] Field of Search .................................. 384/609, 611, 384/614, 615, 617

[56] References Cited

U.S. PATENT DOCUMENTS

| | | | |
|---|---|---|---|
| 1,296,650 | 3/1919 | Graham | 384/614 |
| 3,610,714 | 10/1971 | DeGaeta. | |
| 3,847,456 | 11/1974 | Schwarzbich | 384/623 X |
| 4,081,204 | 3/1978 | Bauer et al. . | |
| 4,541,744 | 9/1985 | Lederman | 384/614 X |
| 4,588,314 | 5/1986 | Anscher | 384/614 |
| 4,708,497 | 11/1987 | Lederman | 384/615 X |
| 4,722,617 | 2/1988 | Stella et al. | 384/523 |
| 4,822,183 | 4/1989 | Lederman | 384/614 X |
| 5,102,241 | 4/1992 | Pflungner | 384/499 |
| 5,120,011 | 6/1992 | Mintgen et al. | 384/617 X |
| 5,417,500 | 5/1995 | Martinie | 384/513 |
| 5,512,871 | 4/1996 | Oudet et al. | 335/220 |
| 5,531,525 | 7/1996 | Hida et al. | 384/482 |
| 5,586,827 | 12/1996 | Unno et al. | 384/450 |

*Primary Examiner*—Thomas R. Hannon
*Attorney, Agent, or Firm*—Michael W. Starkweather

[57] ABSTRACT

A rotatable axial thrust bearing having an upper race upper race flat region and an upper race rounded ball bearing retainer section; a lower race having a lower race flat region and a lower race rounded ball bearing retainer section; an annular retainer for retaining the ball bearing and the lower and upper race without interfering with the lower race when the lower race is placed on a sloped surface. The annular retainer is made up of an upper race retainer lock portion and an outer ball bearing retainer portion positioned on an outer periphery of the thrust bearing. The annular retainer additionally consists of a lower race retainer lock, and an inner ball bearing retainer portion positioned on an inner periphery of the thrust bearing.

8 Claims, 1 Drawing Sheet

BEARING FOR SLANTED SURFACES

BACKGROUND OF THE INVENTION

1. Field of the Invention

This invention relates to rotating ball bearing devices for carrying axial directed thrust loads. In particular, there is a bearing device that can work on slanted surfaces without causing wear to an outer positioned annular retainer (cage) resilient plastic part.

2. Description of the Related Art

Various devices and methods of dealing with reducing friction between opposing surfaces are legion. Examples of patents related to the present invention are as follows, and each patent is herein incorporated by reference for the supporting teachings:

U.S. Pat. No. 5,586,827 is a ball bearing with controlled dynamic imbalance.

U.S. Pat. No. 5,531,525 is a sealed ball bearing.

U.S. Pat. No. 5,512,871 is a rotatable single phase electromagnetic actuator.

U.S. Pat. No. 5,417,500 is a bearing assembly utilizing improved clamping collar.

U.S. Pat. No. 5,102,241 is a radial ball bearing.

U.S. Pat. No. 4,722,617 is a ball bearing assembly.

U.S. Pat. No. 4,081,204 is a ball bearing and ball race.

U.S. Pat. No. 3,610,714 is a ball bearing.

The foregoing patents reflect the state of the art of which the applicant is aware and are tendered with the view toward discharging applicants' acknowledged duty of candor in disclosing information that may be pertinent in the examination of this application. It is respectfully stipulated, however, that none of these patents teach or render obvious, singly or when considered in combination, applicant's claimed invention.

3. Problem with the Related Art

A common problem occurring with the related art ball bearing devices is the positioning of the annular outer positioned resilient plastic retainer. Referring to FIG. 1, there is a prior art ball bearing device 10. The bearing device 10 includes a top race 12 typically made of metal, a bottom race 14, a retainer or cage is made of two parts, namely an inner annular ball retainer 16, and an outer ball retainer 18, and balls or ball bearings 20. The bearing device 10 is mounted between a flat surface 22 and a slanted surface 24. It is noted that location 26 demonstrates that a typical bearing device has the outer retainer so designed as to interfere with proper bearing contact between the lower race 14 and the slanted surface 24. Thus, the outer retainer section 18 will be worn out and destroyed in location 26.

Therefore, there is a need for a bearing device that is designed to fit between a flat surface and a sloped surface and not destroy the outer retainer portion, and still secure the associated race thereto.

SUMMARY OF THE INVENTION

It is a feature of the invention to provide a rotating ball bearing devices for carrying axial directed thrust loads. In particular, there is a bearing device that can work on slanted surfaces without causing wear to an outer positioned annular retainer (cage) resilient plastic part.

An additional feature of the invention is to provide a bearing device that has an outer annular retainer that only retains one race and one side of ball bearings mounted therein.

A further feature of the invention is to provide a bearing device that has an inner annular retainer that only retains an opposite race and an other side of the ball bearings mounted therein.

Yet, another feature of the invention is to provide a bearing device that is designed to fit between a flat surface and a sloped surface and not destroy the outer retainer portion, and still secure the associated race thereto.

Another feature of the invention is to provide a rotatable axial thrust bearing having an upper race race flat region and an upper race rounded ball bearing retainer section; a lower race having a lower race flat region and a lower race rounded ball bearing retainer section; an annular retainer for retaining the ball bearing and the lower and upper race without interfering with the lower race when the lower race is placed on a sloped surface. The annular retainer is made up of an upper race retainer lock portion and an outer ball bearing retainer portion positioned on an outer periphery of the thrust bearing. The annular retainer additionally consists of a lower race retainer lock, and an inner ball bearing retainer portion positioned on an inner periphery of the thrust bearing.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention. Further, the abstract is neither intended to define the invention of the application, which is measured by the claims, neither is it intended to be limiting as to the scope of the invention in any way.

Figure 1:
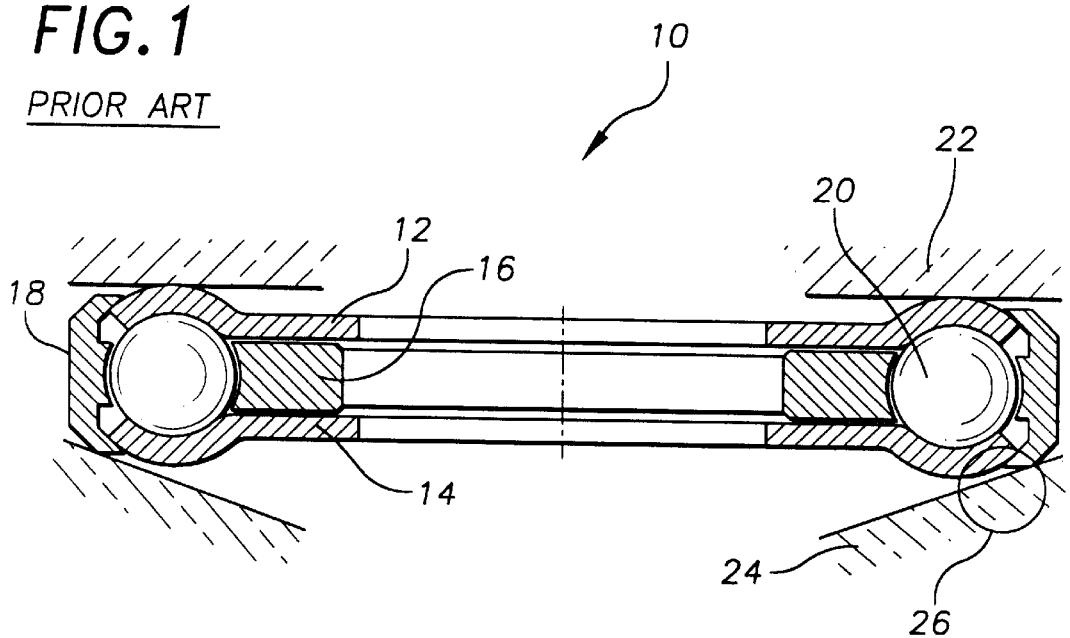
FIG. 1 is a cross sectional illustration of a related art bearing design.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements between the drawings.

DETAILED DESCRIPTION OF THE PREFERRED EMBODIMENT

Figure 2:
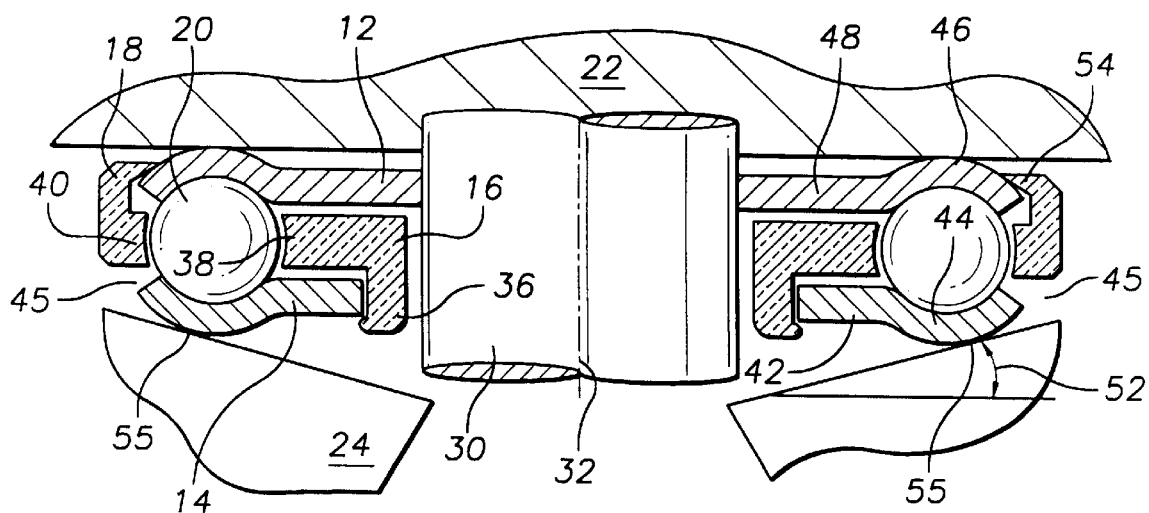
FIG. 2 is a cross sectional illustration of the preferred embodiment as mounted around a shaft on a sloped surface.

The present invention provides a rotating ball bearing device. In particular, regarding FIG. 2 there is a rotatable ball bearing device 10 mounted around shaft 30 having axis 32 and placed between a flat horizontal surface 22 and a sloped surface 24. Besides the elements described in FIG. 1, the bearing device 10 includes the following elements: A lower race retainer lock 36, or lip, and ball bearing retainer portion 38 are both mounted on retainer 16. There is also an upper race retainer lock portion 54, or lip, and ball bearing retainer portion 40 both are part of the outer retainer 18. A lower race flat region 42 and a lower race rounded ball bearing retainer section 44 are both mounted on the lower race 14. An upper race flat region 48 and an upper race rounded ball bearing retainer section 46 are both mounted on the upper race 12. The ball bearing device 10 is designed to operate on a sloped surface 24 that has a slope of 5 to 45 degrees and preferably 15 degrees. An annular set of contact points 55 is defined between sloped surface 24 and lower race 14. Retainers 16 and 18 form a single ball bearing retainer or cage, like a plate having holes therein that are annularly positioned around the periphery of the plate so the ball bearings 20 are mounted and retained properly therein. Thus, the cage 16, 18 surrounds each ball bearing like other cage designs to properly space the ball bearing apart. A clearance region 45 is defined between lower race retainer section 44 and ball bearing retainer portion 40.

Remarks About the Preferred Embodiment

One of ordinary skill in the art of designing and using bearings 10 will realize many advantages from studying and using the preferred embodiment. For example, the outer retainer 18 does not contact the lower race 14. Thus, this allows the lower race 14 to contact the sloped surface 24 without interference from the outer retainer 18 or potentially damaging the retainer 18.

Variations of the Preferred Embodiment

Although the illustrated embodiments discuss the arrangement of a bearing device 10 that has rounded race sections 44 and 46, it is contemplated to form that portion of the race in any shape adaptable to fitting to an adjacent bearing device 10 support surface. Additionally, the retainer sections 16 and 18 can be constructed of any suitable material and not depart from the preferred embodiment. Although, the upper race retainer lock portion 54 and lower race retainer lock portion 36 are illustrated as a lip, it is contemplated to have most any design that would retain a single race to the appropriate retainer section. For example, there could be a lip portion 36 and 54 at selected location around the periphery of the race 12, much like a button down shirt works with spaced apart buttons.

Additionally, a skilled artisan could design the retainer 16, 18 into two separate parts, like an inner and outer retainer fitted together to retain ball bearings and the two races.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the description. All changes that come within the meaning and range of equivalency of the claims are to be embraced within their scope.

What is claimed and desired to be secured by United States Patent is:

1. A rotatable axial thrust bearing having a ball bearing therein, comprising:
   a) an upper race having an upper race flat region and an upper race rounded ball bearing retainer section;
   b) a lower race having a lower race flat region and a lower race rounded ball bearing retainer section; and
   c) an annular retainer for retaining the ball bearing and the lower and upper race without interfering with the lower race when the lower race is placed on a sloped surface, having:
   c1) an upper race lock portion having an inwardly turned upper lip that is disposed over the upper race and an outer ball bearing retainer portion that is positioned adjacent an outer periphery of the thrust bearing; and
   c2) a lower race lock portion having an outwardly turned lower lip that is disposed below the lower race, and an inner ball bearing retainer portion that is positioned adjacent an inner periphery of the thrust bearing.

2. The thrust bearing of claim 1, wherein the annular retainer is designed to operate on a sloped surface that has a slope of 5 to 45 degrees from a horizontal axis extending parallel to the general horizontal orientation of the rotatable axial thrust bearing.

3. The thrust bearing of claim 2, wherein the thrust bearing is designed to extend around a rotatable shaft.

4. The thrust bearing of claim 1, wherein the annular retainer is designed to operate on a sloped surface that has a slope of 15 degrees from a horizontal axis extending parallel to the general horizontal orientation of the rotatable axial thrust bearing.

5. A rotatable axial thrust bearing having a ball bearing therein, comprising:
   a) an upper race having an upper race flat region and an upper race rounded ball bearing retainer section;
   b) a lower race having a lower race flat region and a lower race ball bearing retainer section;
   c) an annular retainer for retaining the ball bearing and the lower and upper races; and
   wherein the annular retainer further comprises:
   d1) an upper race lock portion having an inwardly turned upper lip that is disposed over the upper race and an outer ball bearing retainer portion that is positioned adjacent an outer periphery of the thrust bearing;
   d2) a lower lock portion having an outwardly turned lower lip that is disposed below the lower race, and an inner ball bearing retainer portion that is positioned adjacent an inner periphery of the thrust bearing; and
   d3) the upper race lock portion and the lower race having a clearance region defined therebetween, the clearance region allowing relative movement between the upper race lock portion and the lower race when the thrust bearing is placed on the sloped surface.

6. The thrust bearing of claim 5, wherein the annular retainer is designed to operate with a sloped surface having a slope of 5 to 45 degrees from a horizontal axis extending parallel to the general horizontal orientation of the rotatable axial thrust bearing.

7. The thrust bearing of claim, 6, wherein the thrust bearing is designed to extend around a rotatable shaft.

8. The thrust bearing of claim 7, wherein the annular retainer is designed to operate with a sloped surface of 15 degrees.

* * * * *